Nov. 25, 1952  L. IVERSEN  2,618,941
UNIVERSAL DRIVING CONNECTION
Filed Nov. 25, 1949  4 Sheets-Sheet 1

INVENTOR
Lorenz Iversen
By his attorneys
Hoopes, Leonard & Glenn

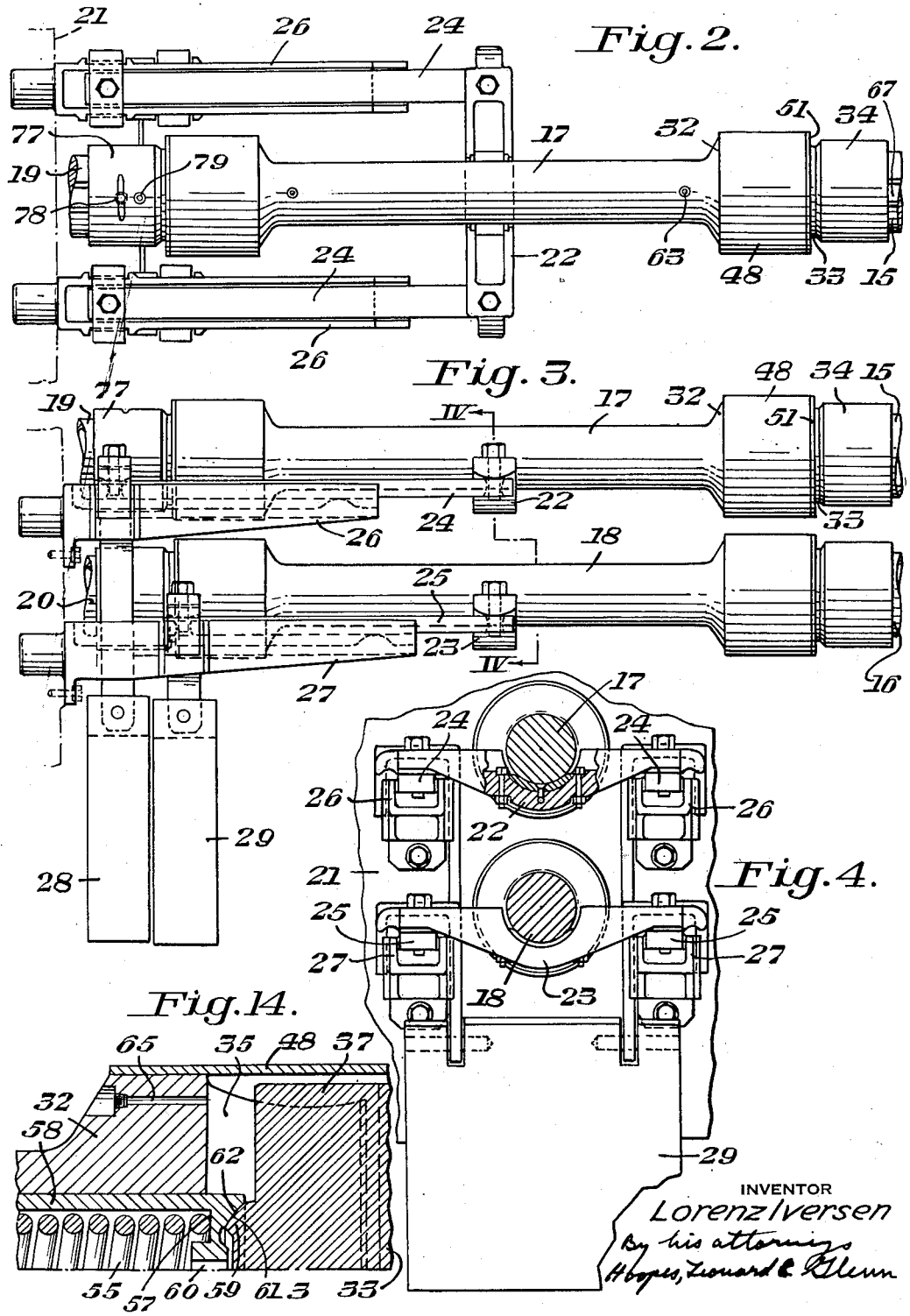

INVENTOR
Lorenz Iversen

Nov. 25, 1952     L. IVERSEN     2,618,941
UNIVERSAL DRIVING CONNECTION

Filed Nov. 25, 1949     4 Sheets-Sheet 4

INVENTOR
Lorenz Iversen
By his attorneys
Hodges, Leonard & Glenn

Patented Nov. 25, 1952

2,618,941

UNITED STATES PATENT OFFICE 2,618,941

UNIVERSAL DRIVING CONNECTION

Lorenz Iversen, Pittsburgh, Pa., assignor to Mesta Machine Company, Pittsburgh, Pa., a corporation of Pennsylvania Application November 25, 1949, Serial No. 129,406

6 Claims. (Cl. 64—7)

This invention relates to universal driving connections, particularly those used in metal rolling mills.

Metal rolling mills are customarily driven through a pair of spindles, each connected at one end through a universal joint to a drive roll neck and at the other end through another universal joint to a drive shaft from a pinion stand. A conventional drive system of this sort is illustrated in my Patent Re. 16,177 reissued September 29, 1925. Such conventional universal spindle connections permit angular adjustments and contraction and extension of the line of drive to accommodate variations in distance between the rolls in the roll stand and have been acceptable for driving the relatively low-speed mills of the past. However, in recently developed mills a spindle may be required to transmit, for example, over 1700 H. P. at over 1000 R. P. M. in regular service and the conventional kinds of universal joints require maintenance and repair too frequently when used in such mills. The main problem is to insure a constant supply of lubricant to all of the frictional surfaces of the universal joint and experience has shown that this cannot be accomplished merely by applying grease to a conventional joint or by wrapping a "boot" around a conventional joint to retain lubricant in the joint. Such sealing means in the past have usually included connections of flexible material and have not held lubricant where it is needed against the centrifugal forces induced by high-speed rotation of the joint when the mill is operating.

The universal joint of my invention has a rigid case for holding a bath of lubricant around the working parts of the joint against high centrifugal pressures. The case is fixedly sealed around one of the joint elements and is pivotally sealed around the other joint element by means of interengaging spherically-curved surfaces which slide together as the angle of drive changes. In this way lubricant is firmly sealed in the joint by a combination of rigid parts, and the difficulties resulting from use of flexible sealing means are avoided. The said spherical surfaces also serve to hold the joint elements in alignment and a spring urging the joint elements apart acts to press the spherical surfaces together to maintain their sealing action. The spring-pressed curved surfaces require a relatively narrow area of contact for effective sealing action and hence only a limited amount of expensive machining is necessary to form these surfaces. A slidable member is interposed between the separating spring and one of the joint elements and the contacting surfaces between the member and element are also spherically curved and pressed together by the spring. The spring and slidable member are preferably mounted in an axially-located cavity within the joint. Lubricant is preferably supplied under pressure to this cavity and thence is forced past the slidable member into the space enclosed by the case until all of the torque-transmitting parts are immersed in a protective bath of lubricant.

The parts for transmitting torque preferably consist of a pair of spaced jaws on one element and a tongue on the other element which projects between the jaws and has a tip portion engaging the spring-pressed sliding member. This leaves no room near the axes of rotation of the joint elements for the conventional cross-member connecting a pair of slippers between the tongue and jaws. Instead, independent slippers are placed on either side of the tongue between the jaws and the function of the omitted cross-member in preventing the joint elements from sliding laterally relatively to each other is assumed by the case and the spherically-curved surfaces which slidably connect the case with one of the joint elements.

The universal joint is assembled as a semi-permanent unit which may be disassembled at infrequent intervals as desired but which does not slide apart axially when the spindles are disconnected from the roll necks or from the pinion stand shafts or when the angle of drive changes. Instead, the joints have splined collars which extend around correspondingly grooved roll necks and pinion stand shafts to allow rotary driving engagement and at the same time free axial sliding movement. When the rolls are to be changed or the spindles are to be disengaged, the roll necks are pulled away from the splined collars to free the rolls, and then the spindles may be pulled away from the pinion stand. Resilient means within the joints hold out the disengaged collars to facilitate reconnecting the spindles.

The universal joint of my invention has proved successful when used to drive fast and powerful modern mills. Further novel features and advantages will become apparent from the detailed description and in the accompanying drawings in which I have shown, for purposes of illustration only, the following presently preferred embodiment of my invention. In the drawings, Figure 1 is a side view of pinion stand and roll stand with driving connections incorporating the invention;

Figure 2 is an enlarged view of the driving connections shown in Figure 1;

Figure 3 is a side view of the driving connections shown in Figure 2;

Figure 4 is a section taken on the line IV—IV in Figure 3;

Figure 14 is a reduced broken-away sectional view of part of the universal joint shown in Figure 5, with the plane of the section rotated 90° about the joint axis.

Figure 1:
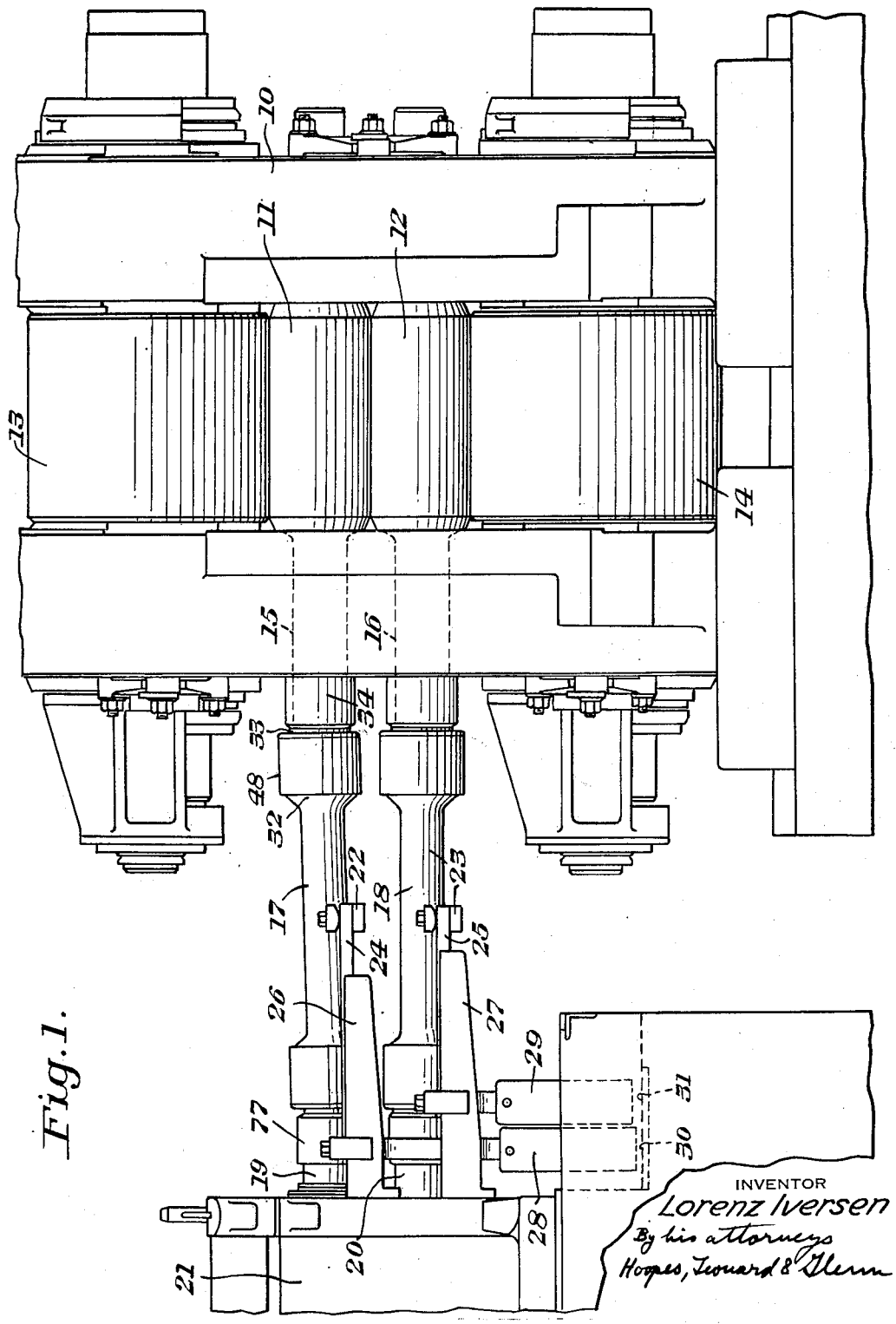

Referring in detail to the drawings, and initially to Figures 1–4 in particular, a roll stand 10 is shown with a pair of work rolls 11 and 12 between a pair of backing rolls 13 and 14. The work rolls 11 and 12 have necks 15 and 16 connected through spindles 17 and 18 to the drive shafts 19 and 20 of a suitably powered pinion stand 21. The central portions of the spindles 17 and 18 rest upon saddles 22 and 23 which are mounted across swinging brackets 24 and 25 (Figures 1, 2 and 3) pivoted on fixed supports 26 and 27 extending from the pinion stand 21 and counterbalanced by weights 28 and 29. When the spindles are lifted from the saddles the resultant movement of the swinging brackets 24 and 25 (counterclockwise as shown in Figure 1) is limited by the weights 28 and 29 coming to rest on foundation surfaces 30 and 31 therebeneath.

The connections at the corresponding ends of the spindles 17 and 18 are identical in arrangement and construction and will now be described in detail with respect to the connection between the upper spindle 17 and the upper roll neck 15, with particular reference to Figures 5–14. The end of the spindle 17 adjacent the roll neck 15 terminates in an integral universal joint element 32 which drives an opposite universal joint element 33. A collar 34 extends integrally from the element 33 and drives the roll neck 15. Torque is transmitted between the universal joint elements by jaws 35 and 36 extending from the element 32 on either side of the opposite parallel flat surfaces of a tongue 37 extending from the element 33. The jaws and flat tongue surfaces are separated by a pair of independent slipper segments 38 and 39.

Figure 11:
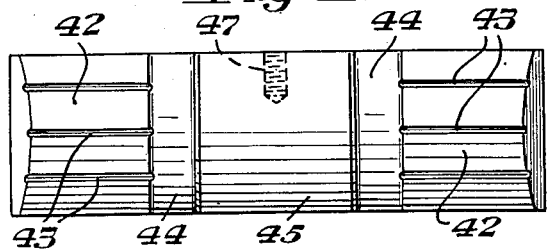
Figure 11 is a top view of a slipper of the universal joint shown in Figure 5.
Figure 12:
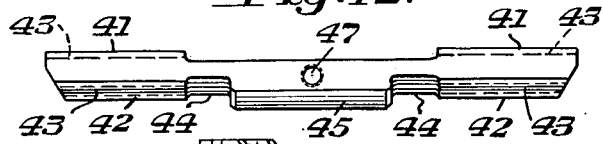
Figure 12 is a front view of the slipper shown in Figure 11.
Figure 13:
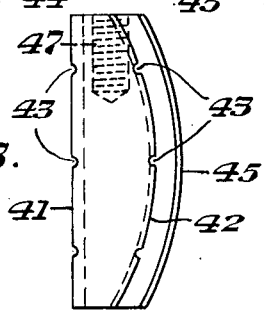
Figure 13 is an enlarged view of the slipper shown in Figure 11.

The elements 32 and 33 are angularly adjustable relative to each other with their axes of rotation always intersecting at a fixed point 40 (Figure 5) which has a constant position relative to each of the elements 32 and 33. The interengaging surfaces of the jaw 35 against the slipper 38 and of the jaw 36 against the slipper 39 are curved cylindrically about an axis extending through the point 40 in a direction normal to the axis of rotation of the element 32 and parallel to the opposite flat surfaces of the tongue 37, in order to allow sliding movement between the jaws 35 and 36 on the slippers 38 and 39 as the angle of drive varies between the elements 32 and 33. The slippers 38 and 39 are identical and the details of the slippers 39 are illustrated in Figures 11–13. As shown in these figures, the slipper 39 at each end has flat surfaces 41 adapted to engage the adjacent flat surface of the tongue 37 and on the other side has cylindrical surfaces 42 adapted to engage corresponding cylindrical surfaces of the jaw 36. Oil grooves 43 extend along the surfaces 41 and 42, which take the sliding and driving load, and the slipper is relieved on both sides of its central portion, as shown at 44 in Figure 11, to convey lubricant to the grooves 43. A transverse cylindrically-extending rib 45 in the middle of the shim engages a cylindrically-extending groove 46 in the jaw 36 to hold the slipper against endwise movement relative to the jaw 36. A lifting tap 47 in the slipper receives a tool for handling the slipper during assembly of the universal joint.

Figure 5:
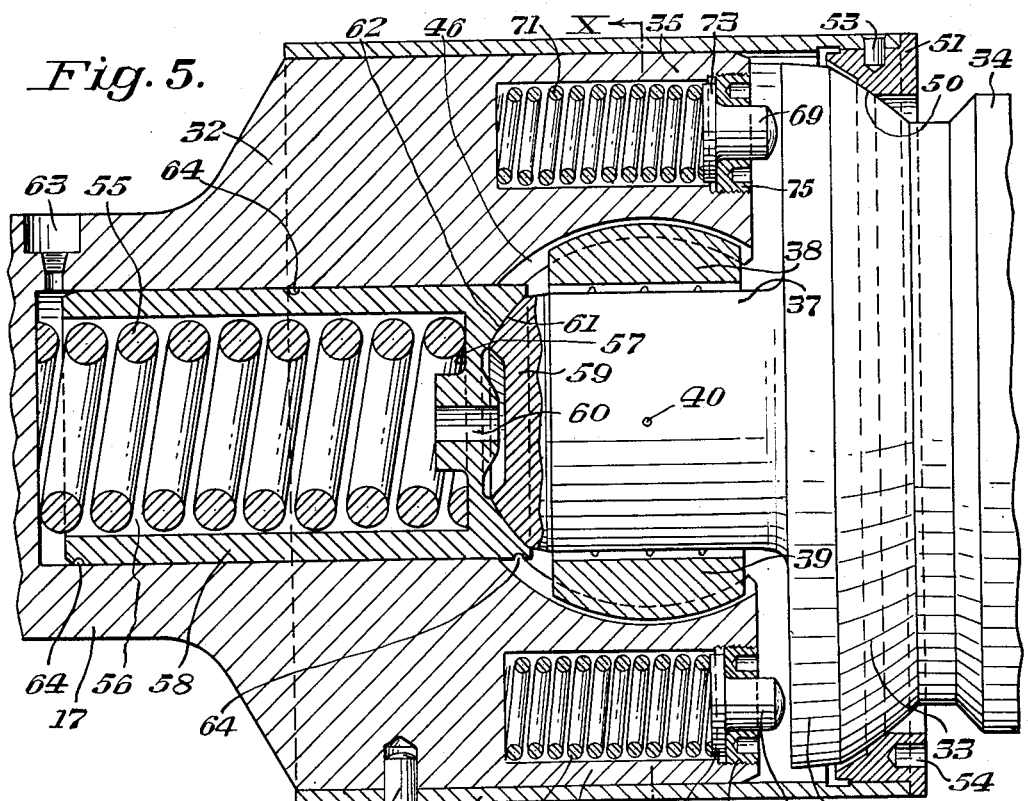
Figure 5 is an enlarged sectional view taken through the axis of the universal joint shown at the right of Figure 2.
Figure 6:
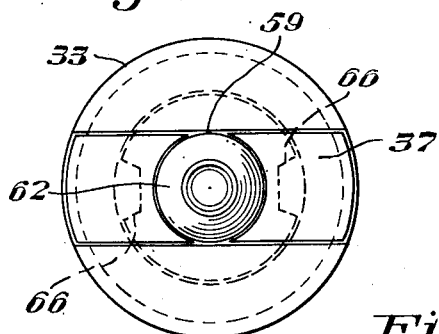
Figure 6 is a reduced end view of the universal joint element shown at the right of Figure 5.
Figure 7:
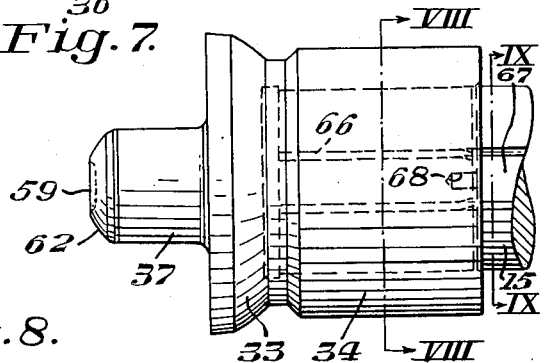
Figure 7 is a side view of the universal joint element shown in Figure 6 with a broken-away portion of a roll neck extending therefrom.
Figures 8, 9:
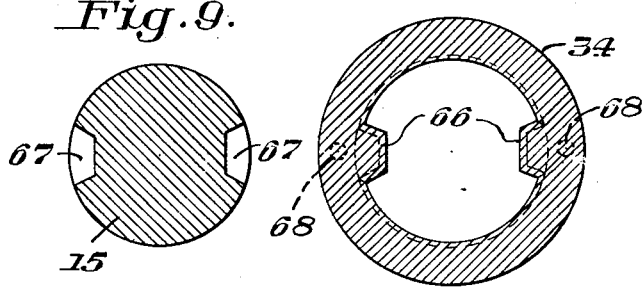
Figure 8 is a sectional view on the line VIII—VIII in Figure 7, with the roll neck removed.
Figure 9 is a sectional view taken through the line IX—IX in Figure 7.

A rigid cylindrical case 48 extends closely around the element 32 and extends around but is spaced radially from the outer edges of the tongue 37 (Figure 14) and from a rim 49 around the element 33 (Figures 5 and 14). An annular surface 50 around the rear of the rim 49 is spherically curved about the point 40 as a center and is slidably engaged by a ring 51 screwed into the case 48. The elements 32 and 33 and case 48 are preferably of steel and the ring 51 of bronze. Pins 52 and 53 lock the case 48 to the element 32 and ring 51, respectively. Openings 54 in the ring are for spanner wrenches to turn the ring for assembly and disassembly purposes. The surface of the ring 51 engaging the rim 49 is spherically curved about the point 40 as a center and fits closely against the spherical rim surface 50. In order to maintain a tight seal between these spherical surfaces a compression spring 55 is mounted in a cylindrical cavity 56 within and coaxial with the element 32. One end of the spring 55 engages the element 32 and the other end engages a shoulder 57 of a sleeve 58, preferably bronze, slidably mounted with the cavity 56. The spring presses the sleeve 58 against a projection 59 on the end of the tongue 37 and thereby urges the elements 32 and 33 apart against the retaining action of the case 48, ring 51 and rim 49.

Figure 10:
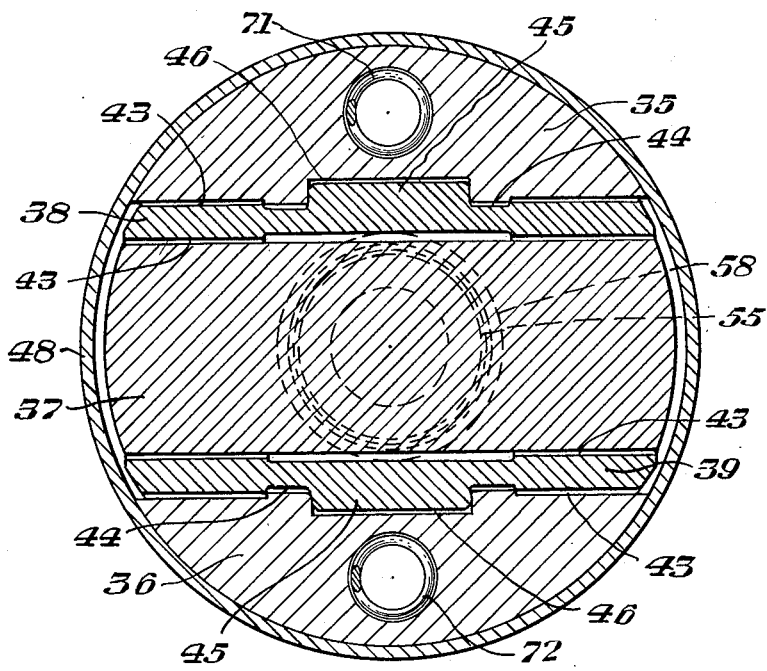
Figure 10 is a reduced sectional view taken on the line X—X in Figure 5.

The end of the sleeve 58 opposite the tongue 37 has a central opening 60 therethrough and spaced from and around the opening has an annular surface 61 which is spherically curved about the point 40 as a center. The sleeve surface 61 engages a corresponding annular and spherically-curved surface 62 on the tongue projection 59. The concentric spherical curvature of the surfaces where the sleeve 58 engages the tongue projection 59 and where ring 51 engages the rim 49 insures that the elements 32 and 33 are pivotal relative to each other about the point 40, and the spring 55 insures that the concentric alignment as well as the close seal between the ring 51 and rim 49 are maintained. In addition to holding the elements 32 and 33 together against axial separation the ring 51 and rim 49 coact in conjunction with the mating surfaces 61 and 62 to prevent the tongue 37 from sliding laterally against the case 48 between the slippers 38 and 39 (horizontally as shown in Figures 5 and 10).

Lubricant for the joint is periodically supplied under high pressure through an opening 63 with a suitable "Alemite" fitting (not shown) into the closed end of the cavity 56. Lubricant fills the cavity 56 and passes through the opening 60 into a space between the sleeve 58 and the tongue bushing 59 in order to maintain a supply of lubricant adjacent the inner edges of the annular bearing surfaces 61 and 62. The lubricant is also forced between the outer surfaces of the sleeve 58 and the walls of the cavity 56 into the annular space on the other side of the bearing surfaces 61 and 62. This movement is facilitated by a spiral groove 64 which extends around the outside and from one end to the other of the sleeve 58 (Figure 5). After passing the end of the sleeve 58 adjacent the tongue 37 the lubricant fills the space around the outer edges of the annular bearing surfaces 61 and 62 and then passes around both sides of the slippers 38 and 39 and fills up the remaining spaces within the case 48 until it reaches and is stopped by the spherical bearing surfaces between the rim 49 and the ring 51. A vent opening 65 extends through the element 32 (Figure 14) and is closed by a suitable pressure-escape valve (not shown) to take care of displacement resulting from the inflow of pressure-fed lubricant. The bath of lubricant substantially fills all of the free spaces within the case 48 and since substantially none of the lubricant can escape, the lubricant around the working parts is unable to drain off even when subjected to high centrifugal forces.

The joint between elements 32 and 33 is not arranged for axial contraction or extension and the collar 34 is therefore provided with axially-extending splines 66 slidably engageable in corresponding grooves 67 in the roll neck 15 to allow axial adjustment to accommodate changes in the angle of drive when the roll 11 moves vertically. Before the roll neck 15 is inserted in the collar 34 lubricant is applied to their engaging surfaces to facilitate the sliding action of these surfaces. Openings 68 in the outer edges of the collar 34 receive handling tools for assembly purposes.

When the roll neck 15 is withdrawn from the collar 34 (to the right as shown in Figure 1) the collar tends to swing downwardly so that it is difficult to reinsert the roll neck. In order to limit this downward pivotal movement the jaws 35 and 36 carry buttons 69 and 70 urged by compression springs 71 and 72 against the rim 49 in a direction parallel to the axis of rotation of the element 32. The buttons 69 and 70 and springs 71 and 72 are slidably mounted in cylindrical cavities in the jaws 35 and 36 and are limited in movement toward the rim 49 by button collars 73 and 74 engaging stop rings 75 and 76 screwed into the button cavities. The projecting ends of the buttons 69 and 70 are spaced out of contact with the rim 49 when the elements 32 and 33 have a line of drive within the usual range of angles of drive during operation of the mill 10.

The connection of the spindle 17 with the drive shaft 19 is identical with its connection with the roll neck 15 except that the collar 77 is locked against axial movement on the shaft 19 by set-screws 78 which extend through the opposite splined sides of the collar 77 and press against the grooved sides of the shaft 19. The collar 77 is locked in this way in order to hold the spindle 17 during withdrawal of the roll neck 15 from the collar 34. Moreover, since relubrication of the collar 77 is made difficult by the fact that the collar 77 is removed from the shaft 19 less frequently than the collar 34 is removed from the roll neck 15, a capped opening 79 is provided in the collar 77 to retain a supply of lubricant for the interengaging surfaces of the collar 77 and the shaft 19.

The universal joint assemblies require lubrication at infrequent intervals and require dismantling for repairs at substantially less frequent intervals. When repairs are to be made the roll neck 15 is disengaged from the collar 34 by withdrawing the roll 11 from the roll stand 10. The set-screws 78 are then loosened and the spindle 17 and collar 77 are pulled away from the drive shaft 19. The spindle 17 is then lifted entirely away from the saddle 22 and is swung preferably to a vertical position, with the joint to be repaired at the upper end of the spindle, to facilitate the disassembly and subsequent reassembly of the universal joint requiring repair. After the repair is completed the spindle 17 is replaced on the saddle 22 and the collar 77 is re-engaged with the shaft 19 and the roll neck 15 is reinserted in the collar 34. The spindle 18 has like connections and is handled in a like manner.

Although I have illustrated and described a present preferred embodiment of the invention, it will be recognized that changes in the details and arrangements may be made without departing from the spirit of the invention or the scope of the appended claims.

I claim:

1. A universal joint for a metal rolling mill comprising a pair of universal joint elements rotatable together about intersecting axes and relatively movable to vary the angle defined by said axes, torque-transmitting means with slidably interengaging surfaces connecting said elements and spaced radially from the axes of rotation of the elements, said means comprising spaced jaws extending from one member and a tongue between the jaws projecting from the other member with slippers separating the jaws and tongue, the slippers on opposite sides of the tongue being separate and independently movable, a rigid enclosure around said elements and means, said enclosure and one of the elements having interengaging annular surfaces which are spherically curved about the intersection of the element axes as a center, thereby permitting pivotal movement of the enclosure relative to said one element while maintaining a seal therebetween, and said enclosure being fixed to and sealed around the other element to complete the sealing of the space between the elements, and axially-located resilient means urging the elements part in an axial direction against the retaining action of the enclosure, thereby pressing said annular spherically-curved surfaces together to tighten the seal therebetween.

2. A universal joint for a metal rolling mill comprising a pair of universal joint elements rotatable together about intersecting axes and relatively movable to vary the angle defined by said axes, spaced jaws extending from one element and a tongue projecting from the other element between said jaws, slippers on opposite sides of the tongue separating it from the jaws, a rigid annular enclosure around said jaws, slippers and tongue, said enclosure and one of the joint elements having interengaging annular surfaces which are spherically curved about the point of intersection of the joint axes, and said enclosure being fastened around the other joint element, axially-located resilient means urging the elements apart in an axial direction, a spring mounted in one of the jaws and extending resiliently toward the tongued joint element, and means on the spring which are out of contact with the tongue joint element when the universal joint is generally straight but which press against the tongue joint element when the axes of the joint elements intersect at a substantial acute angle opening toward the spring, whereby the spring does not interfere with normal rotation of the joint elements but is adapted to hold up one of the joint elements when the other joint element is supported horizontally.

3. A universal joint for a metal rolling mill comprising a pair of universal joint elements rotatable together about intersecting axes and relatively movable to vary the angle defined by said axes, spaced jaws extending from one element and a tongue projecting from the other element between said jaws, separate and independently movable slippers on opposite sides of the tongue separating it from the jaws, a rigid annular enclosure around said jaws, slippers and tongue, said enclosure and one of the joint elements having interengaging annular surfaces which are spherically curved about the point of intersection of the joint axes, and said enclosure being fastened and sealed around the other joint element to complete the sealing of the space within the enclosure, a spring in an axially-located cavity in one of the joint elements, and a member axially slidable in the cavity and urged by the spring against a portion of the other joint element, said slidable member and the said portion of the other joint element having interengaging surfaces spherically curved about the intersection of the joint axes as the sphere center, said element with the axially-located cavity therein having an inlet passage for lubricant extending therethrough into the closed end of said cavity, and said slidable member being formed to release lubricant from said cavity into the space within the rigid enclosure, whereby lubricant forced through the said passage passes into said cavity and into the spaces between the working parts within the enclosure until the enclosure is substantially full of lubricant, so that the enclosure holds the lubricant in said spaces against centrifugal forces while the joint is in operation.

4. A universal joint for a metal rolling mill comprising a pair of universal joint elements rotatable together about intersecting axes and relatively movable to vary the angle defined by said axes, spaced jaws extending from one element and a tongue projecting from the other element between said jaws, separate and independently movable slippers on opposite sides of the tongue separating it from the jaws, a rigid annular enclosure around said jaws, slippers and tongue, said enclosure and one of the joint elements having inter-engaging annular surfaces which are spherically curved about the point of intersection of the joint axes, and said enclosure being fastened and sealed around the other joint element to complete the sealing of the space within the enclosure, a spring in an axially-located cavity in one of the joint elements, and a member axially slidable in the cavity and urged by the spring against a portion of the other joint element, said slidable member and the said portion of the other joint member having interengaging surfaces spherically curved about the intersection of the joint axes as the sphere center, said element with the axially-located cavity therein having an inlet passage for lubricant extending therethrough into the closed end of said cavity, and said slidable member being formed to release lubricant from said cavity into the space within the rigid enclosure, a spring mounted in one of the jaws and extending toward the tongued joint element, and means on the spring which are out of contact with the tongued joint member when the universal joint is generally straight but which press against the tongued joint element when the axes of the joint elements intersect at a substantial acute angle opening toward the spring.

5. In a metal rolling mill a universal drive assembly comprising a spindle, a universal joint element rigidly connected to one end of the spindle, a second universal joint element in driving engagement with the first and swingable relative to the first element to vary the angle of drive through said elements, a coupling projecting from the second element parallel to its axis of rotation and away from the spindle, and means adapted to hold said coupling against swinging downwardly with the second element too far to be engaged with a horizontal roll neck or pinion shaft, comprising a member movably mounted on one of said elements away from its axis of rotation and engageable with the other element, resilient means urging said member toward the said other element, and stop means engageable with said member to limit its travel toward the said other element, said stop means being disposed to hold the member out of engagement with the said other elements when the two elements are axially aligned but to permit the member to engage said other element when the universal joint axes are at a substantial acute angle opening toward said member.

6. In a metal rolling mill a universal drive assembly comprising a spindle, a universal joint element rigidly connected to one end of the spindle, a second universal joint element in driving engagement with the first and swingable relative to the first element to vary the angle of drive through said elements, a coupling projecting from the second element parallel to its axis of rotation and away from the spindle, and means adapted to hold said coupling against swinging downwardly with the second element too far to be engaged with a horizontal roll neck or pinion shaft, comprising a member movably mounted in and projecting from an axially-extending cavity in one of said elements away from its axis of rotation and engageable with the other element, a compression spring in said cavity engaging said member, and stop means mounted on said one element adjacent the open end of the cavity and engageable with said member to limit its travel toward the said other element, said stop means being disposed to hold the member out of engagement therewith when the two elements are axially aligned but to permit the member to engage said other element when the universal joint axes are at a substantial acute angle opening toward said member.

LORENZ IVERSEN.

REFERENCES CITED

The following references are of record in the file of this patent:

UNITED STATES PATENTS

| Number | Name | Date |
|---|---|---|
| 1,949,859 | Charles | Mar. 6, 1934 |
| 2,182,455 | Smith | Dec. 5, 1939 |
| 2,299,351 | Schoenrock | Oct. 20, 1942 |
| 2,460,648 | Miller | Feb. 1, 1949 |